Patented Oct. 23, 1951

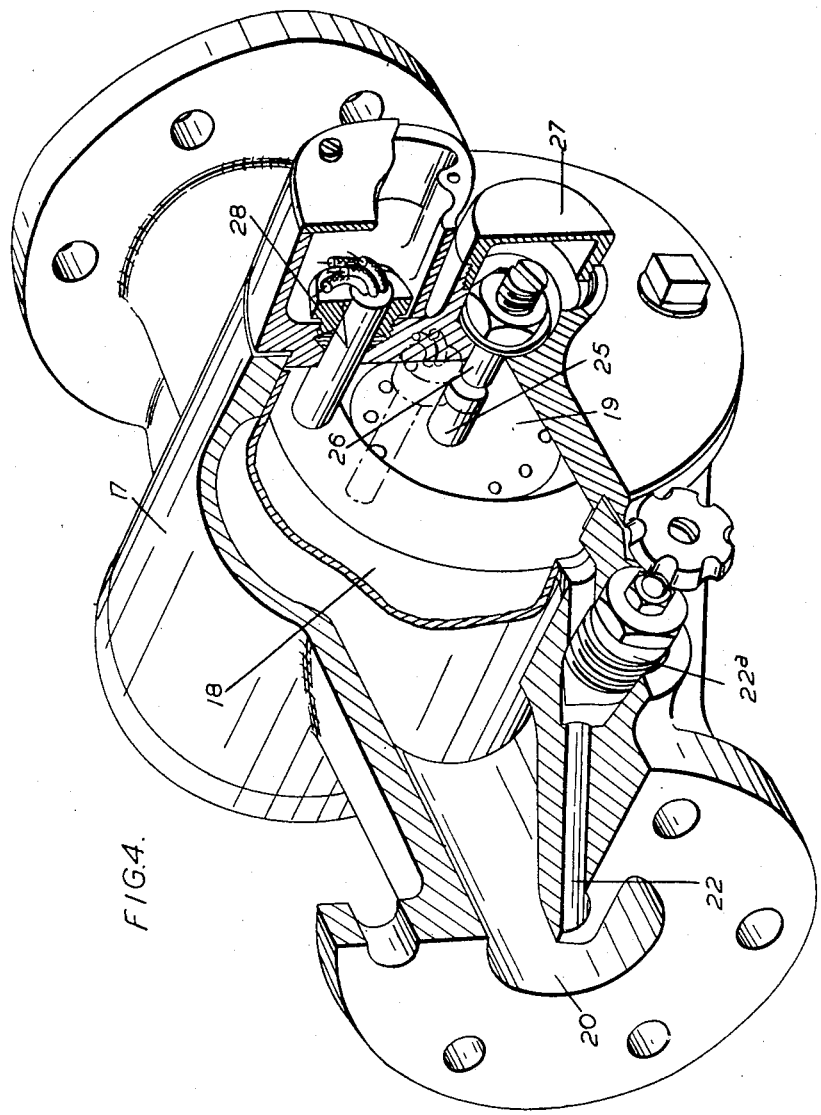

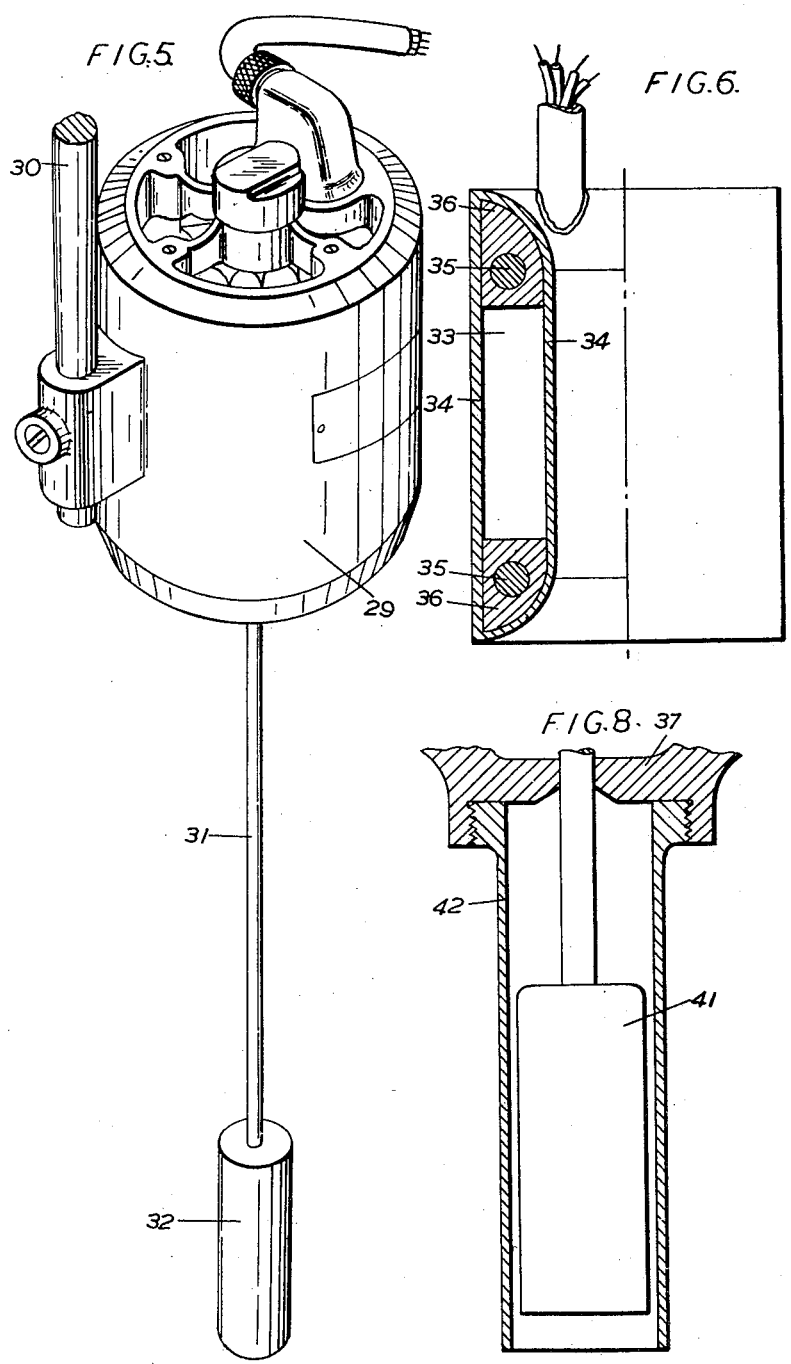

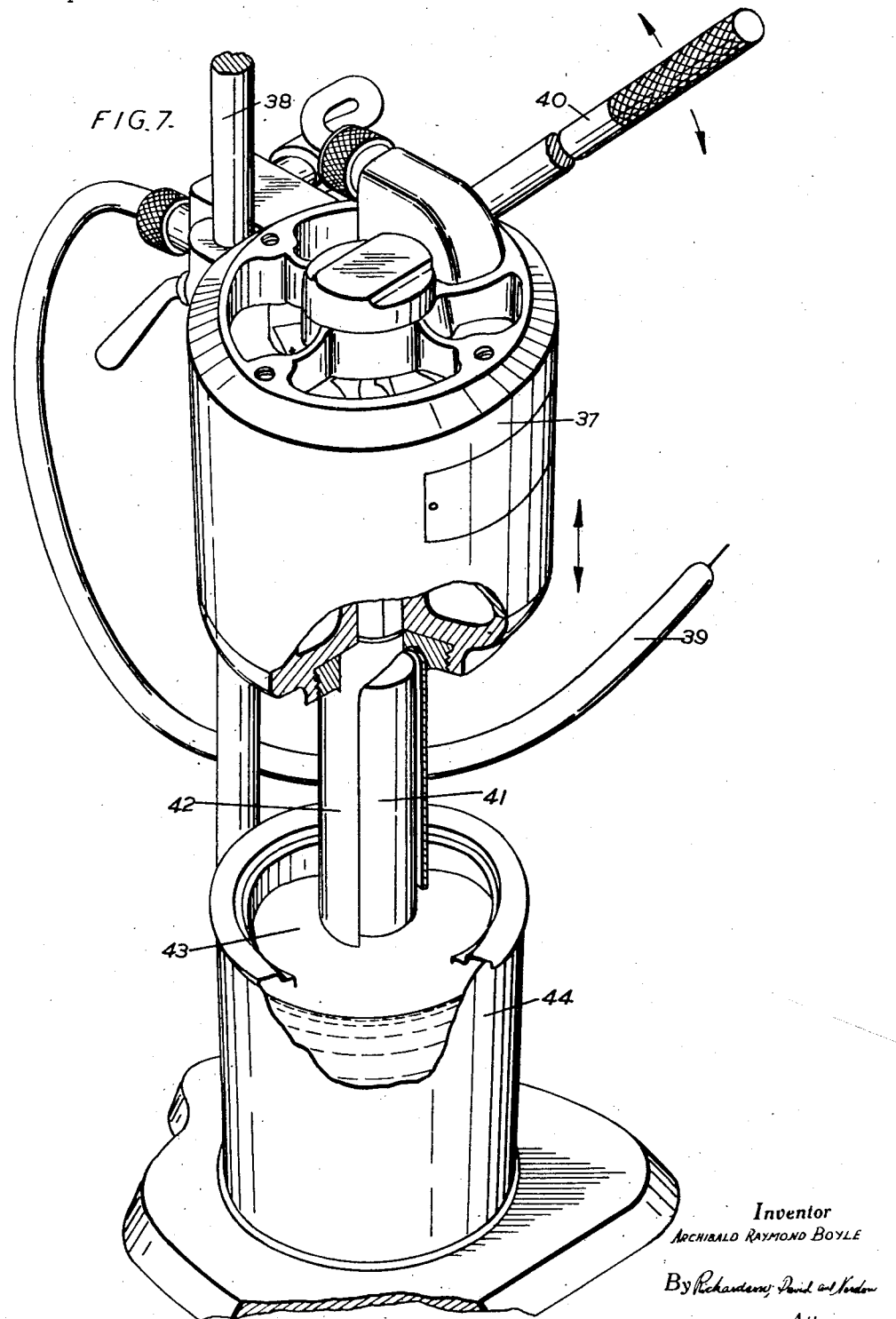

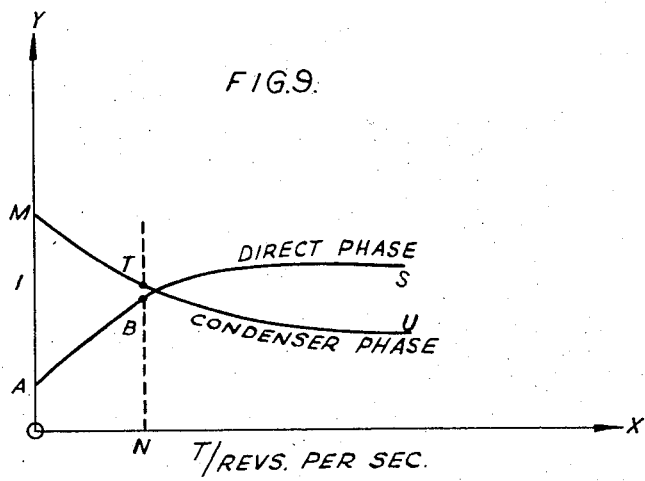
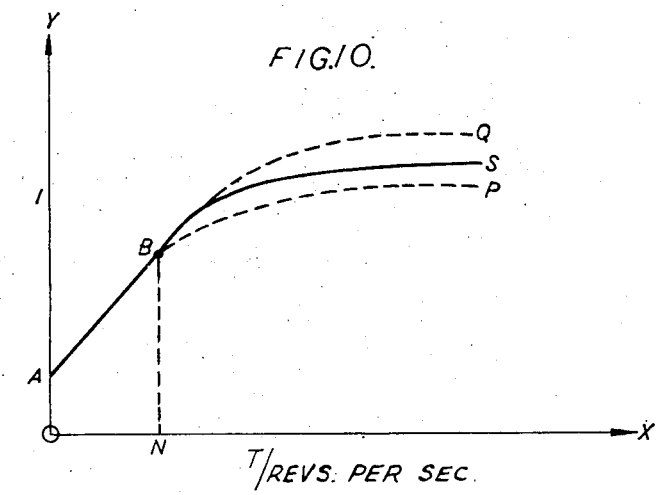

2,572,693

UNITED STATES PATENT OFFICE 2,572,693

ROTATIONAL VISCOMETER

Archibald Raymond Boyle, Glasgow, Scotland, assignor to Dobbie McInnes Limited, Glasgow, Scotland Application April 19, 1949, Serial No. 88,327
In Great Britain April 21, 1948

9 Claims. (Cl. 73—59)

This invention relates to rotational viscometers for measuring the viscosity of liquids, semi-liquids, or like fluent materials (hereinafter and in the claims referred to simply as liquids), in which a rotational body is rotated by an electric motor, the current in said electric motor being measured and being a measure of the viscosity of the liquid in which the rotational body is driven.

In accordance with the present invention, we provide a rotational viscometer comprising a body adapted to be rotated in a liquid under test, a two-phase electric motor adapted to be fed from a single-phase supply and to rotate said body, a reactance connected in one phase of said motor of a value which causes resonance to occur in that phase at approximately synchronous motor speed, and means for measuring the current in the other phase (hereinafter called the "direct phase").

The rotational body may be placed in the liquid under test, or the liquid under test may be fed through a space in which the rotational body moves.

In one example the stator and rotor of the electric motor themselves define a passage through which the liquid under test passes.

Some embodiments of the invention will now be described simply by way of example with reference to the accompanying drawings in which—

Fig. 4 is an outside perspective elevation partly broken away for clearness showing some details of the arrangement shown in Figs. 2 and 3.

Fig. 5 is a perspective view of a complete viscometer.

Fig. 6 is a detail axial section through the stator of the viscometer shown in Fig. 5.

Fig. 7 is a perspective view of a further complete viscometer.

Fig. 8 is a detail axial sectional view showing the rotor of the viscometer of Fig. 7.

Figs. 9 and 10 are curves illustrating the functioning of the circuit shown in Fig. 1.

Fig. 11 is a circuit diagram similar to Fig. 1, but showing a modification in which the viscometer is combined with means for automatically varying the speed of rotation thereof over a given range in order to obtain a continuous flow diagram.

Figure 1:
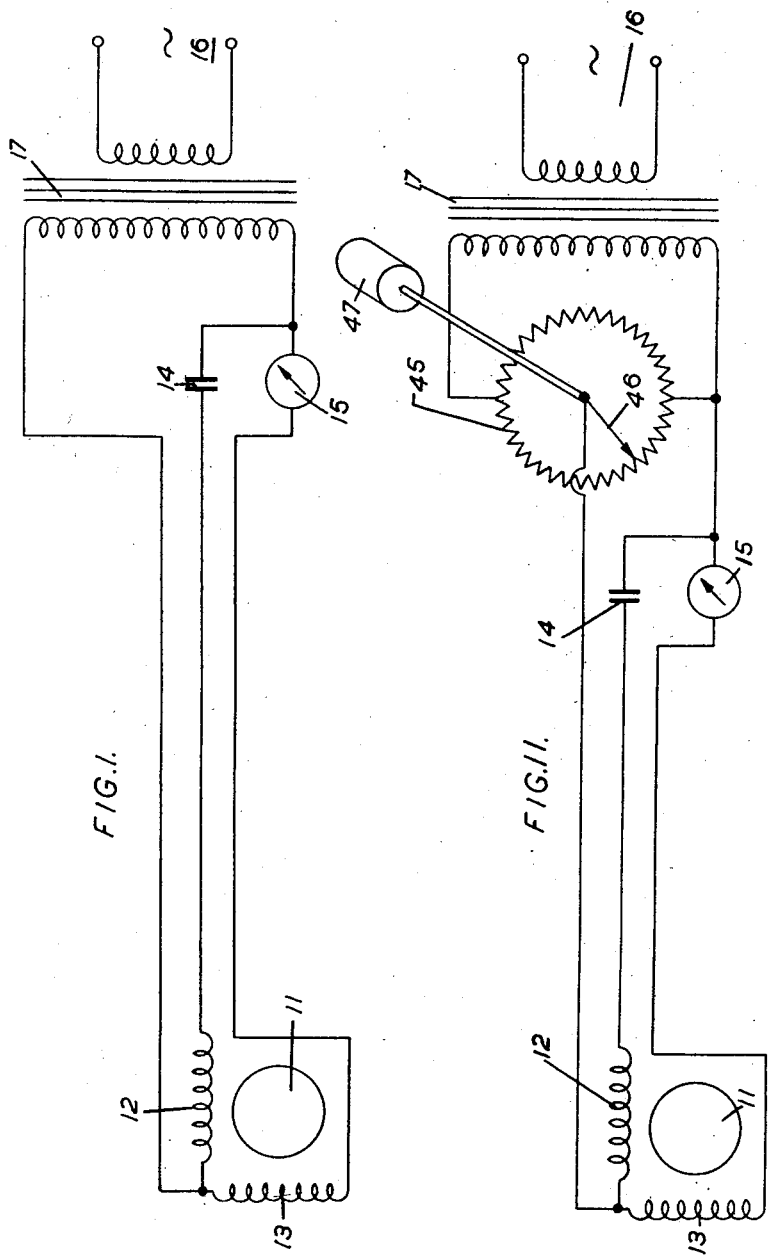
Fig. 1 is a circuit diagram showing the electrical parts of a viscometer in accordance with the invention.

In Fig. 1 the electric motor comprises a rotor 11, with stator windings 12 and 13 arranged in two phases at 90° electrical apart, the winding 12 having a condenser 14 in series therewith (this constituting the "condenser phase") and winding 13 having a current measuring instrument 15 in series therewith (constituting the "direct phase"). These two phases are fed from a single phase supply 16, through a transformer 17.

It is explained that referring to the movement of a body through a liquid, by definition the viscosity of the liquid is directly proportional to the shear force of the body divided by the rate of shear. The shear force multiplied by the torque arm is equivalent to the actual torque value, while the rate of shear may be stated in terms of revolutions per second of the body (revs. per sec.). Now in any electric motor the current input is a function of the ratio torque divided by speed of rotation, or that ratio is equivalent to the viscosity multiplied by a constant.

From this it follows that the viscosity of the liquid is a function or measure of the input current. Under the present invention the current in the direct phase 13, 15 is measured and this provides certain important advantages as hereinafter explained.

The synchronous speed of the motor is determined by the supply frequency and the number of poles on the motor. Knowing this in advance, the capacity of the condenser 14 is selected to give the circuit a natural periodicity corresponding to such synchronous speed, whereby resonance occurs in the circuit at or about synchronous speed.

Fig. 9 shows one example of a curve of current I against the ratio torque T divided by revs. per sec., the curve MTU being for the condenser phase and the curve ABS for the direct phase. The vertical OAMY corresponds to synchronous speed or maximum resonance with minimum current in the direct phase and maximum current in the condenser phase. The resonance curve is damped somewhat by the resistances of rotor and stator.

If the total input current of the two phases is measured, this would be a combination of the curves MTU and ABS which would give a more or less level line. The current measured in the direct phase is approximately a "reflection" but in the opposite sense of the current in the condenser phase within the working range, but the two curves are not completely symmetrical and thus the resultant change in the total current taken by the two phases together involves a smaller change than that in the direct phase alone. By measuring the current in the direct phase only a considerable magnification is obtained at or adjacent to the resonant part of the curve, the working part corresponding to AB which corresponds approximately to a straight line. Thus a small change in viscosity can give a relatively large change in the measured current.

Fig. 10 shows, for the same co-ordinate axes, at ABS, ABQ and ABP, typical curves for the direct phase corresponding to applied voltages varying by approximately plus or minus 20% ABP, corresponding to a voltage approximately 20% below ABS and ABQ corresponding to a voltage approximately 20% above ABS. It is possible by applying normal design principles to arrange that a series of such curves coincide over the working range AB so that the current in the direct phase is independent of reasonable variations in the applied voltage; this may be effected, for example, by selection of the number of turns on the stator, and by design of the resistance of the rotor and stator parts.

In contradistinction, with variations in the applied voltage, the current in the condenser phase will vary over the whole range, i. e., the curve MTU would be translated upwards or downwards. Thus the current in the condenser phase within the working range would not be independent of the applied voltage.

With the circuit shown in Fig. 1, it is possible by normal design methods to vary parts of the circuit such as the gap in the iron circuit, the resistance of the rotor strips or bars, and the number of poles in the coils, to obtain advantageous results as follows:

(1) The working part AB of the direct phase is a substantially straight line.

(2) The gradient of the part AB can be predetermined and can be made substantially steep so as to obtain a relatively large variation in current for a relatively small variation in viscosity.

(3) The height OA can be kept small. Electrical or mechanical "backing off" methods are used on the indicating meter 15 to make use of the full scale thereon, that is, to minimise the amount of non-useful movement of the indicator up to the point where the minimum current is indicated; and for efficiency, such backing off should be kept to a small percentage of the full scale indication. Referring to Fig. 9, the amount of backing off required for measuring in the direct phase corresponds to OA, this corresponding to the initial movement of the indicator up to the point of minimum current. On the condenser phase the point of minimum current (within the working range) is at T, showing a backing off corresponding to the height NT which is much greater.

It will be clear therefore that by measurement of the current consumption in the direct phase important advantages are obtained over either measurement of the total input current of both phases, or measurement in the condenser phase only, because firstly substantial magnification is obtained; secondly the current is independent of variation in applied voltage; and thirdly a relatively small amount of backing off is required.

In use, the motor is continuously driven, and if the viscosity increases the motor speed drops down until the viscosity drag is balanced by the torque of the motor, and then a reading of the current provides a measure of the viscosity. Similarly when the viscosity falls the motor increases speed until balance is again obtained, when a fresh reading is given.

Figure 2:
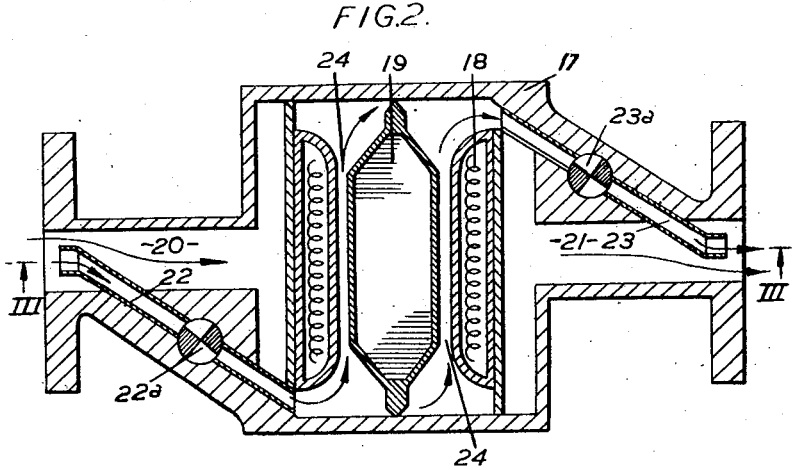
Fig. 2 is a cross sectional plan view on the line II—II of Fig. 3 illustrating a construction in which the electric motor stator and rotor themselves define a passage for the liquid under test.
Figure 3:
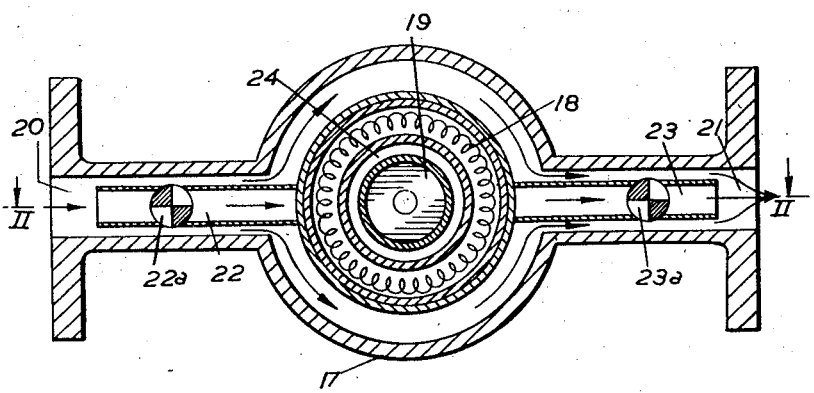
Fig. 3 is a sectional elevation on the line III—III of Fig. 2.

In Figs. 2, 3 and 4, the viscometer is formed within a casing 17 and comprises stator 18 and rotor 19 of a two-phase motor, the rotor 19 being of squirrel cage type connected as in Fig. 1. The liquid under test flows through the passages 20 and 21 in the direction shown by the arrows and a proportion thereof is by-passed through passages 22, 23, provided with valves 22a, 23a so as to flow continuously through the space 24 between the rotor and stator.

Figs. 2 and 3 are somewhat diagrammatic and Fig. 4 shows some external details of the practical embodiment, the valve 22a corresponding to that shown diagrammatically in Figs. 2 and 3 and being mounted in watertight manner in the casing 17 and provided with an externally operated handgrip.

The rotor spindle is shown at 25 and is mounted in watertight manner in the casing being secured in position in a bearing 26 at each end, said bearings each being enclosed by a cover 27.

The bearings for the rotor should have the minimum of friction and of viscous drag and may, as shown, comprise cones or points on the rotor mounted in corresponding jewelled sockets screw set in the casing, any leakage through the bearing thus being avoided; alternatively a ball and plate or ball and ball construction can be utilised.

The electric leads to the stator coils enter through a screw junction box having a gland 28, and cables may be included for temperature compensation purposes, for example for measuring the temperature of the liquid, and/or for thermostatically controlling the temperature of the liquid in the space between the rotor and stator.

Wherever required cement may be provided to ensure a leak-proof seal.

A viscometer as shown in Figs. 1 to 4 may be used for various purposes, for example, for measuring the variation in viscosity of a liquid flowing through a high pressure pipeline or other vessel, variation in that characteristic causing variation in the externally measured current of the electric motor direct phase; and this in turn may bring into operation a consequential control.

In Fig. 5, the viscometer comprises an electric motor 29 of similar type to that already described and which is vertically adjustable on a guide 30, the rotor having a depending spindle 31 having a rotational element 32 which can thus be immersed in the liquid under test. The variation of current in the direct phase is measured by a remote current measuring device, and this arrangement may be utilised for example, for indicating when a chemical or physical characteristic in a liquid has reached a given stage.

It is usually advisable to protect the stator and rotor windings from contact with the liquid, and this may be done for example by first thoroughly impregnating the windings and then covering the complete windings and laminations with a non-conducting, non-magnetic cement, for example synthetic resin cement. The interior of the stator and the exterior of the rotor are then ground to the correct shape. This arrangement gives smooth working surfaces.

In a modification a covering of non-magnetic, corrosion resisting material and high electrical resistivity, for example glass or alloy metal, may be fitted around the rotor and possibly another around the stator, and it is advisable to back the coverings with a cement.

As shown in Fig. 6, the stator 33 of the motor is provided with a covering 34, and has windings 35 bedded in heat proof cement 36.

Only one half of the stator is shown in Fig. 6, the other half being of identical construction.

In Fig. 7, the motor 37 is vertically adjustable on a guide 38 and the current in the direct phase is measured remotely through a conductor 39.

Operation of handle 40 in the downward direction causes the rotor extension 41 to be moved downwardly along with the detachable outer sleeve 42 in order to immerse them in the liquid 43 under test, which is shown by way of example in a container 44.

In this construction the gap between rotor 41 and sleeve 42 can be varied by interchanging sleeves of different internal diameters, thus changing the range of operation of the viscometer depending on whether liquids of high or low viscosity are to be measured.

The rotational body may be of any convenient shape instead of cylindrical as shown, for example, it may be of rotary blade form, or may comprise a plate sliding rotationally on a fixed plate, with the liquid as a film between them.

The rotor is usually of squirrel cage construction, although a wound rotor may be utilised.

The range of the viscometer may be varied by altering the mechanical or electrical characteristics thereof, for example the gap width at the rotational body, the length of rotor and stator, or the diameter of rotor; moreover the number of stator poles can be altered, the greater the number of poles the higher the range. Further, a portion of the indicating scale for indicating the current consumption may be selected and electrically amplified, or the frequency of the supply may be changed.

Alternatively, variable gearing may be provided between the motor shaft and the rotational body. As the viscosity reading is then approximately proportional to the square of the gear ratio it is found most convenient to make the gear ratios 1:1, 10:1, 100:1, and 1000:1. This means that the scale readings are approximately multiplied by 100 for each gear change.

It is of course possible to place the milliammeter or other viscosity indicator in any desired position within reasonable limits, and to have any number of milliammeters in various positions in this circuit. The gear change may be operated by a relay, if desired, to change the range from a remote position.

Automatic control of apparatus may be obtained by using the change of measured current to operate appropriate changes in the liquid flowing into the viscometer, by use of servo mechanisms or the like.

In industrial plants the viscosity reading scale may be colour-coded, and by way of example, the needle is normally maintained over a certain coloured area of the scale as long as the plant is running correctly. Automatic alarms can be made to operate if the milliammeter position alters beyond this range.

Recording galvanometers may be attached to give a clear record of changes in viscosity, either as a check on the constancy of a product, or to measure and control expected changes during a chemical reaction.

The apparatus may be used as a static instrument in a laboratory if desired, but its greatest advantages appear when it is used on an industrial plant, for example in a vat or pipe-line, or in side tubes attached to them. In order to make certain of rapid indication of changes in viscosity a slight "rifling" or other similar grooving or ridging, may be machined onto the surface of the rotational body in order to ensure positive flow of the liquid through the viscometer.

When, for example, in an industrial plant, the temperature of a liquid in a pipe-line varies, temperature effects can be compensated by using thermometers, for example, platinum resistance, or thermocouples, in the viscometer, or in a position in the liquid nearby, and indicating on dials preferably adjacent to the viscosity dial.

To indicate a viscosity result corrected for a temperature other than the temperature of test, the electrical outputs of thermometer and viscometer may be electrically mixed.

When the layer of liquid in the viscometer is thin, that is, of small mass, a thermostatically controlled arrangement around the cylinder will correct for small changes in temperature even when the flow speed is fairly high.

When very high accuracy of indication is desired a circuit may be used in which a small portion of the milliammeter scale is taken and expanded. This may be brought about by a suitable increase in sensitivity of the milliammeter and the application of a suitable backing off voltage fed directly from the supply or battery to bring the expanded range onto the scale of the milliammeter.

For a "true" liquid this ratio of shear divided by rate of shear is constant for various speeds of rotation, that is with variation of the voltage applied to the motor.

This "true" liquid is known as a "Newtonian liquid." However, for other types of liquids known as "non-Newtonian liquids," for example emulsions, or suspensoids, or colloids, the apparent viscosity thereof as measured in the viscometer changes with change in the rate of shear owing to the effect of the rotation of the viscometer on the particles although the physical characteristics of the liquid outside the viscometer are unchanged.

I have found that the viscosities of such non-Newtonian liquids may be compared with a standard viscosity or with their own viscosity at a given rate of shear by comparing the flow diagram thereof, that is the diagram showing the variation of the apparent viscosity with variation of rate of shear, that is of speed of the viscometer.

Thus, in further accordance with the invention, there is provided a rotational viscometer as aforesaid, in combination with means for automatically varying the speed of rotation thereof over a given range, and means for making a continuous record of variation of the measured (i. e., the apparent) viscosity against variation of the speed. This enables a continuous flow diagram to be obtained and hence one can compare the viscosity of the liquid under test with any standard liquid at any speed, whether a Newtonian or non-Newtonian liquid.

This arrangement may conveniently be effected by providing a synchronous motor adapted to vary a potentiometer governing the supply voltage of the viscometer. Thus the supply voltage is varied between maximum and minimum limits automatically; the variation may be uniform or in accordance with any predetermined law.

Referring to Fig. 11, the parts shown correspond to Fig. 1, the same numerals indicating similar parts, but a potentiometer 45 is incorporated in the secondary circuit of the transformer 17, the arm 46 of the potentiometer being continuously rotated by a synchronous motor 47 through a reduction gear box. In this way a continuous record of variation of the measured viscosity against variation of speed of the viscometer is obtained as aforesaid.

I claim:

1. A rotational viscometer comprising a body adapted to be rotated in a liquid under test, a two-phase electric motor adapted to be fed from a single-phase supply and to rotate said body, a reactance connected in one phase of said motor of a value which causes resonance to occur in that phase at approximately synchronous motor speed, and means for measuring the current in the other phase.

2. A viscometer as claimed in claim 1, in which the electric motor comprises a stator and rotor which define between them a gap for the liquid under test, the rotor constituting said rotatable body of the viscometer.

3. A viscometer as claimed in claim 2, comprising a first conduit for the liquid which causes a portion thereof to by-pass the gap between the stator and rotor, and a second conduit which causes a portion of the liquid under test to be passed through said gap.

4. A viscometer as claimed in claim 1, in which the motor rotor constitutes the rotatable body and the stator and/or the rotor is or are totally enclosed in a protective external sheath.

5. A viscometer as claimed in claim 1 in which the motor rotor constitutes the rotatable body, and the rotor spindle is extended so as to project substantially clear of the stator so that the extremity thereof may easily be inserted in a container for the liquid under test.

6. A viscometer as claimed in claim 1, in which the motor rotor constitutes the rotatable body and the rotor or one end thereof is movable axially of the stator in order to cause it to be projected axially into or to be withdrawn axially from the liquid under test.

7. A viscometer as claimed in claim 1, in combination with means for automatically varying the speed of rotation thereof over a given range, and means for making a continuous record of variation of the measured viscosity of the liquid under test, against said variation of the speed.

8. A rotational viscometer comprising a two-phase electric motor adapted to be fed from a single phase supply, a rotor for said motor, a rotor spindle extended so as to project substantially clear of the motor stator so that the extremity thereof may easily be inserted in a container for the liquid under test, sleeve means at least partly surrounding that part of the rotor extension adapted to enter the liquid under test, said sleeve means providing a clearance with such extension, a reactance connected in one phase of said motor of a value which causes resonance to occur in that phase at approximately synchronous motor speed, and means for measuring the current in the other phase.

9. A viscometer as claimed in claim 8, in which said sleeve means is removable so as to be interchangeable with other sleeve means in order to vary said clearance with the rotor extension and thus vary the sensitivity of the viscometer.

ARCHIBALD RAYMOND BOYLE.

REFERENCES CITED

The following references are of record in the file of this patent:

UNITED STATES PATENTS

| Number | Name | Date |
| --- | --- | --- |
| 1,449,458 | Sutermeister | Mar. 27, 1923 |
| 1,942,920 | Fawkes | Jan. 9, 1934 |
| 2,354,923 | McNamee | Aug. 1, 1944 |